C. B. BRISTOL.

CURRY-COMB.

No. 6,956. Reissued Feb. 29, 1876.

Witnesses.

A. H. Shumway

Clara Broughton

Chas. B. Bristol

By Atty. Inventor

Wm. G. Eaul.

N. PETERS, PHOTO-LITHOGRAPHER, WASHINGTON, D. C.

UNITED STATES PATENT OFFICE.

CHARLES B. BRISTOL, OF NEW HAVEN, CONNECTICUT, ASSIGNOR TO W. & E. T. FITCH, OF SAME PLACE.

IMPROVEMENT IN CURRY-COMBS.

Specification forming part of Letters Patent No. 83,757, dated November 3, 1868; reissue No. 6,956, dated February 29, 1876; application filed January 10, 1876.

*To all whom it may concern:*

Be it known that I, CHARLES B. BRISTOL, of New Haven, in the county of New Haven and State of Connecticut, have invented a new Improvement in Curry-Combs; and I do hereby declare the following, when taken in connection with the accompanying drawings and the letters of reference marked thereon, to be a full, clear, and exact description of the same, and which said drawings constitute part of this specification, and represent, in—

Figure 1:
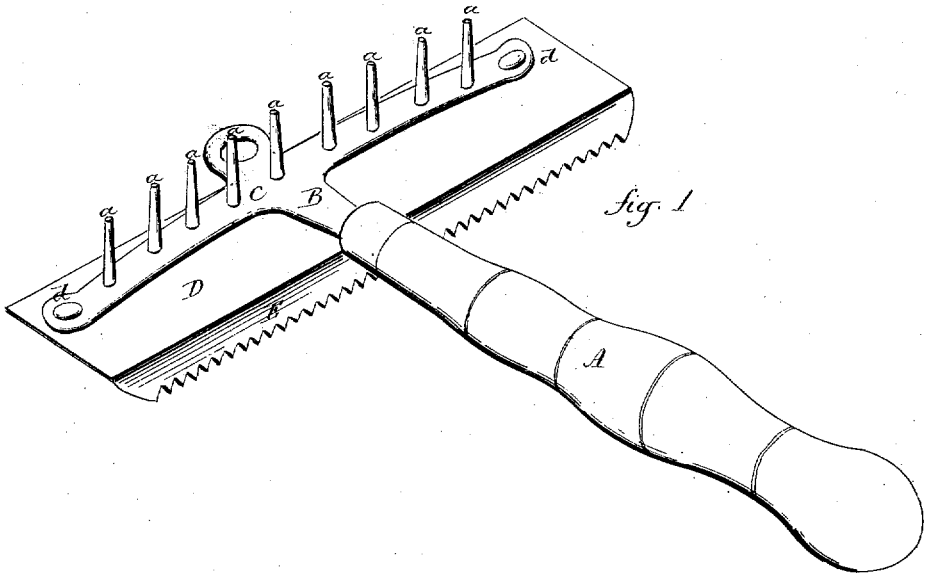
Figure 2:
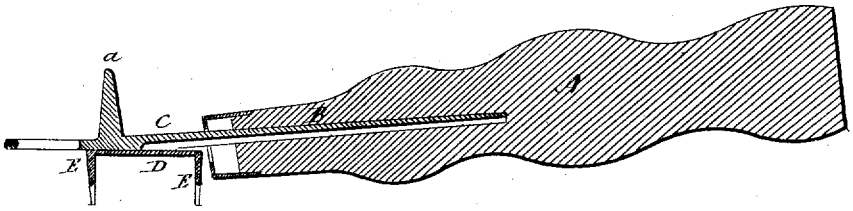
Figure 3:
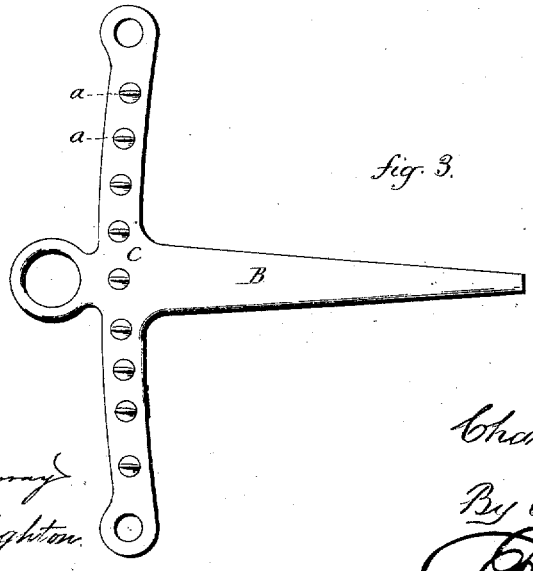

Figure 1, perspective view of the comb complete; Fig. 2, central section; Fig. 3, top view of the shank and comb.

This invention relates to an improvement in curry-combs, and particularly to that part which is termed the "mane-comb"—that is, a comb with long teeth for the purpose of combing the mane—the object being to produce a simple, cheap, and durable structure; and the invention consists in constructing the bar and teeth which form the mane-comb in one and the same piece, the teeth being substantially conical in form; also, in constructing the mane-comb and shank in one and the same piece.

C is the mane-comb bar, with teeth *a a* projecting vertically therefrom, and cast in one and the same piece with the bar. The teeth *a* are substantially cylindrical in form, or so as to present a rounded surface, which prevents the cutting of the hair of the mane. For the purpose of conveniently attaching the handle the mane-comb bar is constructed with a shank, B, extending to the rear, and so as to be inserted into the handle A. The comb proper is attached to the bar by rivets *d*, or other suitable devices. Made in a single plate, D, the two edges E, turned down and cut into fine teeth, enables the production of a very cheap and simple comb.

I do not wish to be understood as broadly claiming the combination of a mane-comb with a curry-comb, as such, I am aware, is not new.

I claim—

1. In combination with a curry-comb, the mane-comb consisting of the bar C and conical teeth *a*, substantially as described, and attached to the back of the comb.

2. In a curry-comb, the bar C, teeth *a*, and shank B, substantially as described, and attached to the back of the comb.

CHAS. B. BRISTOL.

Witnesses:

J. H. SHUMWAY,

CLARA BROUGHTON.